(No Model.) 2 Sheets—Sheet 1.
M. A. KELLER.
AUTOMATIC BICYCLE BRAKE.
No. 581,885. Patented May 4, 1897.
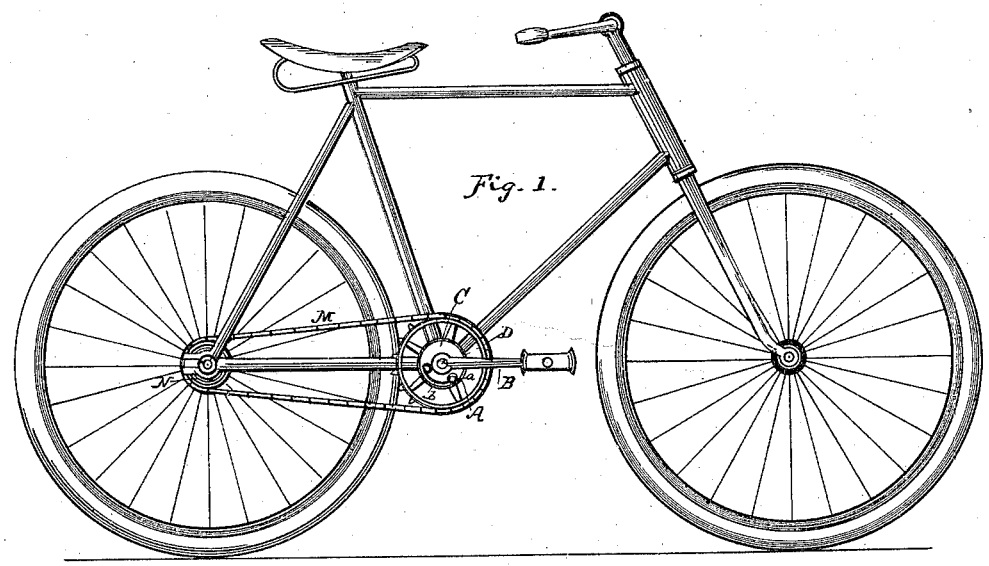
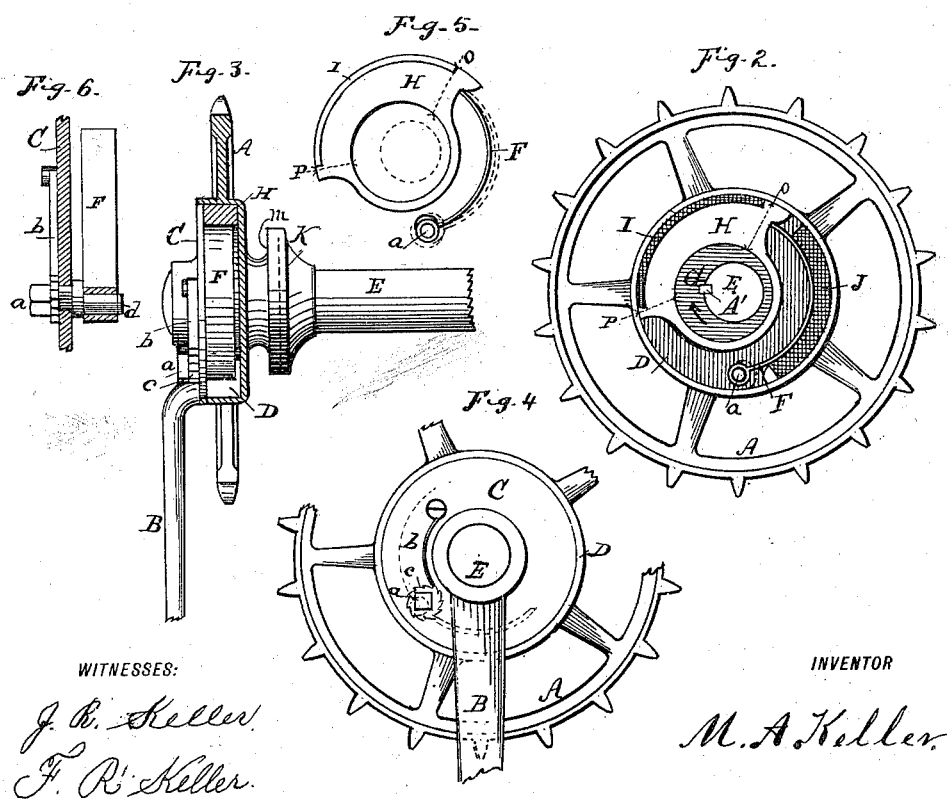
WITNESSES:
J. R. Keller
F. R. Keller
INVENTOR
M. A. Keller

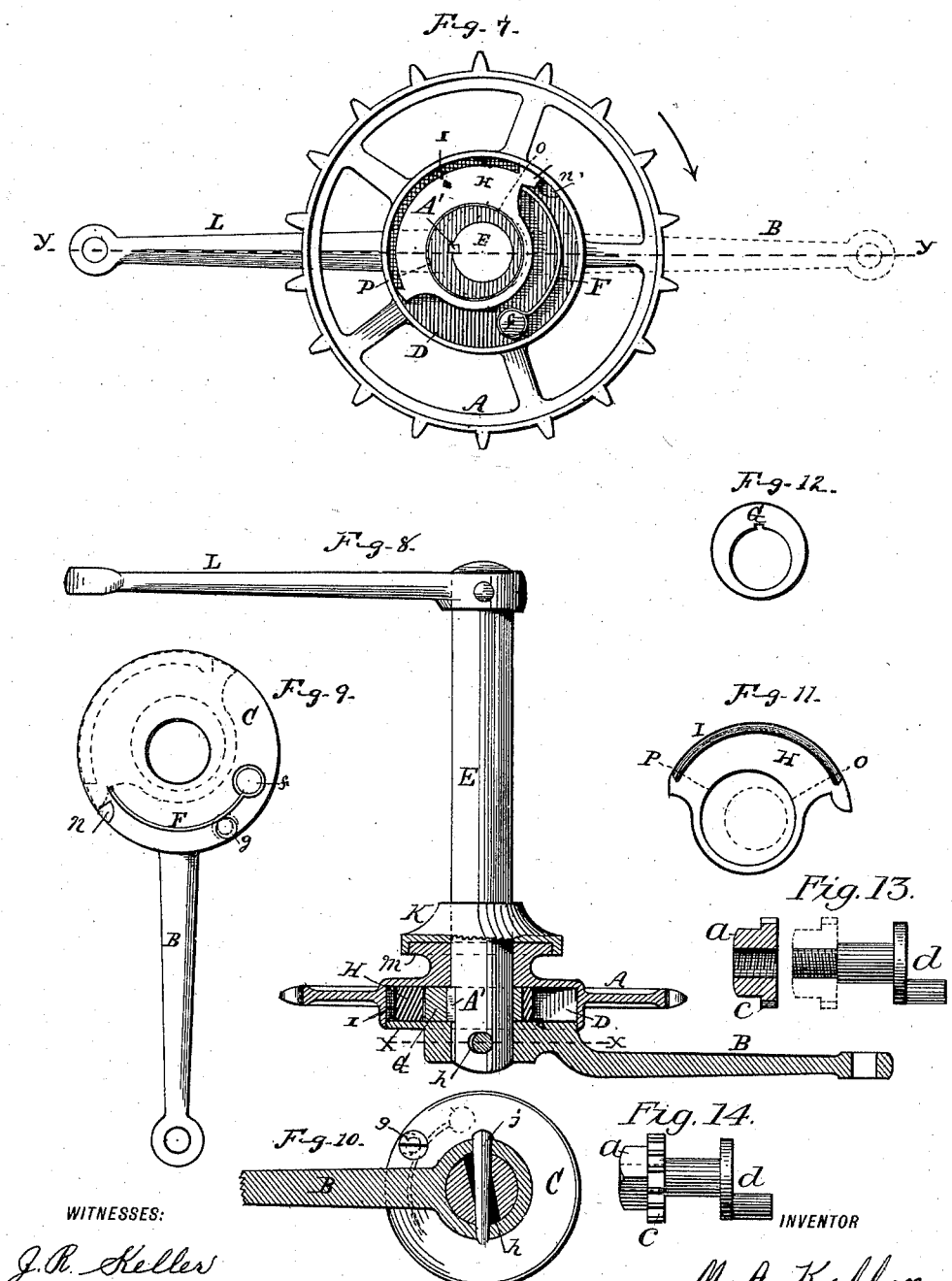

UNITED STATES PATENT OFFICE.

MOSES A. KELLER, OF BATAVIA, NEW YORK.

AUTOMATIC BICYCLE-BRAKE.

SPECIFICATION forming part of Letters Patent No. 581,885, dated May 4, 1897.

Application filed April 10, 1896. Serial No. 587,047. (No model.)

*To all whom it may concern:*

Be it known that I, MOSES A. KELLER, a citizen of the United States, residing at Batavia, in the county of Genesee and State of New York, have invented a new and useful Improvement in Automatic Brakes for Bicycles and Similar Vehicles, of which the following is a specification.

My invention relates to improvements in automatic brakes for bicycles, in which a friction clutch-dog operates in conjunction with the chain sprocket-wheel and an eccentric on the shaft of said wheel; and the objects of my improvement are, first, to provide an automatic brake which is simple, light, and invisible; second, to act automatically by stopping to pedal and holding the crank-shaft stationary with the feet on the pedals. I attain these objects by the mechanism illustrated in the accompanying drawings, in which—

Figure 1 is a right-hand side view of a complete bicycle, showing my brake applied and in its normal position. Fig. 2 is a full side view of the driving sprocket-wheel with the right-hand pedal-arm removed to show the internal arrangement of my improvement. Fig. 3 is a detail sectional view of my improvement with a portion of the crank-shaft. Fig. 4 is a side view of a portion of the sprocket-wheel and right-hand pedal-arm containing my complete invention and as the same would appear when put together for use on a machine. Fig. 5 is a full face view of the frictional clutch-dog. Fig. 6 is a detail sectional view of the spring action. Fig. 7 is a full face view of the driving sprocket-wheel, showing the parts in their normal position and the proper position of the pedal-arms when the machine is under the brake. Fig. 8 is a transverse sectional view taken through the dotted line $y\ y$ of Fig. 7. Fig. 9 is an inside face view of the right-hand pedal-arm and disk removed from the crank-shaft. Fig. 10 is a transverse sectional view taken through the dotted line $x\ x$ of Fig. 8. Fig. 11 is a full face view of the friction clutch-dog, and Fig. 12 is an end view of the cam which actuates the clutch-dog. Fig. 13 is a detail view of the crank-pin and ratchet-nut, and Fig. 14 is a similar detail of crank-pin and ratchet-nut put together as the same would appear when in its place on the disk.

Similar letters refer to similar parts throughout the several views.

In the drawings, A represents the main or driving sprocket-wheel, which is usually secured rigidly on the crank or pedal shaft E, but in my improvement I journal this wheel on the shaft and form a groove in the hub and a recess $m$ in the roller-bearing cone, into which the hub of the wheel extends, thereby protecting the wheel-bearing from the dust and dirt. The sprocket-wheel is further provided with an annular flange D, formed concentric with its bearing, and thus forms a drum about the hub, as plainly shown in Figs. 7 and 8. Next I fit an eccentric G on the shaft E within the drum of the wheel and the same is secured on the said shaft by a key A' or other suitable means in the manner as shown in Fig. 8. Upon this eccentric is journaled the frictional clutch-dog H, and on the outside circumference is placed a leather shoe I, the shape and curve of which fit against the inside periphery of the drum D in the manner as shown in Figs. 7 and 8.

It will be seen by reference to Figs. 2 and 7 that the portion of the dog H is larger across the line O than on the line P. A spring F is secured to the disk C of the pedal-arm B, and its free end bears against the dog H on the forward side, as shown in Figs. 2 and 7. Now when the shaft E, with eccentric G, turns in the direction of the arrow-point shown in Figs. 2 and 7 it will force the dog H out against the flange D, and any resistance of the wheel A will cause the wheel to be locked to the dog by the friction of the leather shoe I against the drum D, and the wheel A is thus caused to revolve with the shaft E. Now when the shaft E is stopped while the machine is in motion the action of the eccentric G is thereby reversed, because the wheel A, and not the eccentric, acts on the dog H and thus loosens the dog's hold on the flange of the drum, but against the resistance of the spring F, which latter causes a friction between the leather shoe I of the dog and the drum D of the sprocket-wheel. To still further provide frictional resistances to the wheel A, I have placed a leather shoe J between the spring F and the drum D of said sprocket-wheel, as the bend of the spring and the reaction of the dog H on the spring cause the latter to bend outward and thereby press the leather shoe J against the periphery of the drum.

It will be seen that the spring F is journaled on a pin $a$, that is secured in the disk C of the pedal-arm B, which arm is journaled on the shaft E and held in its place by pin $j$. The spring F is shown in Figs. 2 and 7 to show its position when the disk C and arm B are on the shaft.

Now it is necessary to provide means to take up wear and regulate the desired amount of friction on the brake-shoes I and J. For this purpose I have provided the pin $a$ with a crank-pin $d$ and a ratchet $c$ and a click-spring $b$. Now by turning the pin $d$ the spring F can be set tighter against the clutch-dog H one or more notches of the ratchet $c$, as may be necessary. Another modified form for this purpose is shown in Fig. 9. In this case the spring F is pivoted on a stationary pin F' and an eccentric-nut $g$ made to act on the back of the spring. In this case the extra brake-shoe J is dispensed with. Still another modified form is shown in Fig. 10, but all the same parts of Fig. 9 are retained, and the construction shown in Figs. 3, 4, and 6 can also be retained with the arrangement shown in Fig. 10. The object of this latter is to apply more or less friction by means of the pressure of the feet on both the pedals while the latter are held stationary. This is accomplished in the following manner: The disk C is provided with a stop $n$. (See Fig. 9.) When the disk is in its place, this stop is in or nearly in contact with H, (see $n'$, Fig. 7.) Now the pin $j$, that secures the arm B and disk C to the shaft E, fits into a hole $h$, that is in the shaft E, which is made larger on opposite sides and ends of the pin. This will allow the pedal-arm B to move on the shaft E when back-pedaling and force the stop $n$ against the clutch-dog H and thereby increase the friction, and thus the rider can regulate the amount of friction at will by his feet.

It will be seen by the foregoing description that the brake becomes automatic the moment the rider stops pedaling if he keeps his feet on the pedals and stops the rotation of the crank-shaft. The sprocket-wheel A will then be caused to revolve against the frictional resistance created by the brake-shoe or clutch-dog H and can be stopped entirely by pressing both feet down on the pedals, and the moment the rider begins to pedal to propel the machine the wheel A becomes clutched to the shaft E by means of the clutch-dog H, as the wheel cannot turn on the shaft but in one direction only; and when the rider is off the machine the latter can be moved freely in either direction, as the brake is all contained in the sprocket-wheel and is in no way connected with the frame to prevent the free turning of the wheels in either direction. Thus all the parts are invisible and self-acting. It is, however, obvious that the device would readily operate also on the rear sprocket, (designated by N in Fig. 1.) In that case the chain M would become stationary when the brake was applied to stop the machine, instead of moving, as in the present construction.

The novelty of the invention is apparent to any one at a glance and that various modications in its construction can readily be made without departing from the essence of my inveation.

Having thus fully described my invention, what I claim, and desire to secure by Letters Patent, is—

1. In a bicycle-brake, the combination with the pedal-shaft, a driving sprocket or gear journaled on said shaft, an eccentric keyed on said shaft, a frictional clutch-dog journaled on said eccentric and operating in conjunction with the said sprocket or gear, and a spring, means connecting it with said clutch-dog, to hold the same in contact with the said sprocket or gear and cause it to operate, in the manner substantially as described.

2. In a bicycle-brake the combination of the pedal-shaft, of a sprocket-wheel journaled about said shaft, an eccentric fast on said shaft, a frictional clutch-dog journaled on said eccentric and adapted to hold said sprocket and cause it to revolve with the shaft when turning in the forward direction and release the wheel when turning in the backward direction, and a spring coacting with said clutch-dog and holding the latter in yielding contact with the said sprocket-wheel, substantially as described.

3. In a bicycle-brake, the combination of the pedal-shaft having an eccentric secured to it, a driving gear or sprocket wheel journaled on said shaft and provided with a cylindrical drum about the shaft, a frictional clutch-dog or brake-shoe journaled on said eccentric and adapted to operate in conjunction with the inside periphery of said drum to form a brake, and a spring, means connecting it with the clutch-dog, said spring holding the dog in contact with the periphery of the drum of said sprocket and causing the clutch to act as a brake-shoe when said sprocket-wheel turns on the shaft, substantially as described.

4. In an automatic-acting brake for bicycles or similar vehicles, the combination comprising a pedal-shaft, a gear or sprocket wheel journaled on the shaft, a frictional clutch-dog journaled eccentrically to the axis of the said gear-wheel and operating in conjunction therewith to hold the wheel from turning on the shaft in the backward direction, a spring connected with the clutch-dog to prevent lost motion between the frictional faces of the said wheel and clutch-dog, a supplemental brake-shoe interposed between the back of the said spring and the periphery of the drum, and means for adjusting said spring to give any desired frictional resistance to the said wheel, substantially as described.

5. In a bicycle or similar vehicle, the main gear or sprocket shaft provided with pedal-arms, a sprocket or gear journaled on the shaft and provided with a cylindrical flange or drum, an eccentric fast on the said shaft, a friction-clutch journaled on the eccentric and provided with suitable brake-shoe operating in conjunction with said cylindrical flange, a pedal-arm journaled on said shaft next the eccentric and provided with a spring connecting it with the said clutch, and adapted to hold the latter in contact with the cylindrical flange of the sprocket, substantially as and for the purpose set forth.

6. The combination with the pedal-shaft of a bicycle, a gear or sprocket journaled on said shaft and provided with a flange forming a drum or cylinder concentric about the shaft, an eccentric rigid on the shaft within said cylinder, a friction-clutch journaled on the eccentric and adapted to fit the inside periphery of said cylinder and operating in conjunction therewith, a pedal-arm journaled on said shaft next the eccentric, and having a limited vibrating movement on said shaft, a spring connected with the pedal-arm and adapted to engage the friction-clutch and hold the same in contact with the cylinder-flange of the sprocket, to clutch the latter to the shaft when forward pedaling, and permit the sprocket to revolve when the pedals and shaft are stopped, a pin or projection rigid with the said movable pedal-arm and adapted to engage with the friction-clutch when back-pedaling is applied on said pedal-arms and force said clutch against the inside periphery of the cylinder-flange of the sprocket with increased friction and thereby check the speed or stop the machine as the rider wills, all arranged for operation in the manner, substantially as and for the purpose set forth.

7. In a brake for bicycles or similar vehicles the combination with the pedal-shaft, of a driving gear or sprocket wheel journaled on said shaft and provided with a cylindrical drum, a frictional clutch-dog also journaled on said shaft, a removable pedal-arm mounted on said shaft next the said driving-gear and provided with a spring operating in conjunction with the said clutch-dog to hold the latter in yielding contact with the said cylindrical drum of the driving-gear, and means connected with said removable arm for adjusting the tension of said spring, all as and for the purpose set forth.

8. In a brake for bicycles or similar vehicles, the combination with the pedal-shaft, of a driving-gear journaled on said shaft and provided with means for frictional contact with the said shaft, a clutch-dog journaled on said shaft and operating in conjunction with said gear by frictional contact, a pedal-arm journaled on the said shaft next the said driving-gear, and provided with a spring acting on the said clutch to hold the latter in contact with the said gear, and a stop on said pedal-arm operating in contact with the said clutch-dog to increase the frictional resistance of said clutch-dog, in the manner substantially as described.

M. A. KELLER.

Witnesses:
J. R. KELLER,
F. R. KELLER.